United States Patent [19]
Weller et al.

[11] Patent Number: 6,046,664
[45] Date of Patent: *Apr. 4, 2000

[54] WELDING POWER SUPPLY TRANSFORMER APPARATUS AND METHOD

[75] Inventors: William P. Weller, Minneapolis; Thomas D. Chandler, Coon Rapids, both of Minn.

[73] Assignee: Century Manufacturing Company, Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/035,621

[22] Filed: Mar. 5, 1998

[51] Int. Cl.⁷ .............................. H01F 27/24; H01F 27/28
[52] U.S. Cl. .......................... 336/212; 336/195; 336/182; 336/214
[58] Field of Search ..................................... 336/212, 195, 336/131, 178, 182, 214

[56] References Cited

U.S. PATENT DOCUMENTS 4,550,364  10/1985  Shaw .......................................... 363/24
5,596,305  1/1997  Puri ........................................... 336/205
5,815,062  9/1998  Koyuhara et al. ....................... 336/233

FOREIGN PATENT DOCUMENTS 160796  2/1937  European Pat. Off. ................. 336/12

OTHER PUBLICATIONS

Ceobra product publication, Cebora Stampa Tecnica/Stanpato C/120 FIS/9/92/5000, 2 pages (Sep. 1992).

Primary Examiner—Michael L. Gellner
Assistant Examiner—Anh Mai
Attorney, Agent, or Firm—Merchant & Gould P.C.

[57] ABSTRACT

A welder power supply configuration wherein the power supply includes a combined transformer and inductor assembly wherein the combined transformer and inductor assembly is comprised of a four-legged core, primary windings, secondary windings and inductor windings. The four-legged core includes isolation slits in the leg of the four-legged core shared by the inductor and transformer in order to isolate the magnetic flux of the inductor from the remaining lens in the four-legged core assembly.

2 Claims, 5 Drawing Sheets

WELDING POWER SUPPLY TRANSFORMER APPARATUS AND METHOD

FIELD OF THE INVENTION

This invention relates to power supplies for welders, and particularly to an improved transformer and inductor assembly for use in high power applications operating at power input standards that comply with the UL Safety Standards for Arc Welders 551 and CSA C22.2#60 limits.

BACKGROUND OF THE INVENTION

Electrical transformers have been widely used in welding power supplies to transfer electrical energy between a source and a load circuit by employing a magnetic field which links the source and the load circuits. Electrical transformers have been used for changing voltage, matching impedencies and isolating circuits.

For many of these applications, an inductance was required to ensure proper performance of the power supply. Accordingly, it was necessary to add a separate inductor to the circuit. The separate inductor added circuitry, weight, cost and complexity to the device. Specifically, in the portable welder environment, the addition of circuitry, complexity, costs and weight has a substantial impact.

The prior art has combined the transformer and inductor in a single unit in an attempt to address the above-noted concerns. Typically, a combined transformer and inductor core element was provided with two flux line paths, one path for the inductors DC flux and one path for the transformers AC flux. The inductor flux line path is comprised of a core path that has an air gap around which the inductive winding are wound. The transformer primary and secondary windings were wound about a continuous core element having no air gap.

These improvements enhanced the art of transformer construction for circuits requiring an inductance. An advantage of combining the transformer and inductor was to eliminate the need for two separate mountings and for combining the transformer windings and the inductance windings around a single transformer and inductor core frame. This resulted in a reduction in weight and material cost in the combined units.

These prior art combined transformer and inductor apparatus have been widely and used for low power applications. These prior art combined transformers have been used significantly in the portable welder environment because reduction in weight and material costs are substantial features in the portable welder market. Industry developments have caused a need for portable welders that are adaptable to standard 60 Hz 120 VRMS volt inputs to be capable of high current outputs, while maintaining low current input requirements in accordance with UL and CSA requirements. However, the combined transformer and inductor apparatus disclosed in the prior art are not well suited for high power applications that allow for power inputs within the UL and CSA requirements. Complications arise when the prior art combined transformer and inductor apparatus were operated at high power levels. The power limitations are related to heat dissipation and that higher power output requires higher power inputs.

With the advent of demand for higher power output levels for portable welders that function within the power input requirements set forth by UL and CSA standards, there arose a need for a single core combined transformer and inductor apparatus capable of operating at high power levels, while still operating within the UL and CSA input power requirements. Merely increasing the scale of the prior art designs by making cores and coils larger is not a viable solution in the portable welder environment. In addition, the prior art combined transformers and inductors had substantial problems resulting from the previous single core combined transformer and inductor apparatus because there was a level of flux leakage from the inductor portion of the core into the limbs of the transformer core. Leakage of inductor DC flux into a transformer center limb causes a reduction in transformer efficiency, resulting in excessively high heat generation. The reduction in efficiency requires an increase in power input in order to achieve higher power output. In the prior art single core combined transformer and inductor apparatus the increase in input current was above the threshold level requirements set by UL and CSA. Accordingly, the prior art designs of single core combined transformer and inductor apparatuses have been satisfactory for low power applications but have not been satisfactory for high power applications wherein the input requirements are within UL and CSA standards. As a result, welder power supply circuitry that has high power output requirements and input power requirements that are within the CSA and UL requirements, such as the circuitry disclosed in U.S. Pat. No. 5,426,409, utilized separate transformer and inductor cores in order to comply with UL and CSA standards. There is a need for a single core combined transformer and inductor apparatus that allows a welder power supply to achieve higher power output levels while at the same time satisfying the UL and CSA requirements and reducing some of the problems associated with prior art combined transformer and inductors.

Therefore, it is an object of the present invention to provide an improved single core combined transformer and inductor apparatus for use in welder power supplies that reduces problems caused by higher power output requirements while satisfying UL and CSA requirements.

It is an object of the invention to reduce the weight, material costs and complexity within the power supply of a portable arc welder.

SUMMARY OF THE INVENTION

A welding power supply for supplying power to a welding electrode wherein the transformer and inductor within the power supply are combined and created from a single core having four legs. The transformer includes a primary winding for receiving a single phase AC current from a single phase AC power source and at least one secondary winding. The inductor includes a winding wound around the core for receiving DC current. The primary winding is wound around a first leg of a four-legged core to comprise the transformer center leg. The at least one secondary winding is also wound around the first leg of the four-legged core. The inductor winding which receives DC power is wound around a fourth leg to comprise the center leg of the inductor. A second leg of the four-legged core comprises a first outer leg of the transformer. A third leg of the four-legged core comprises a second outer leg of the transformer and an outer leg of the inductor. The third leg includes at least one slit in the center of the leg in order to isolate the magnetic flux traveling through the third leg from the inductor away from the remainder of the core. The transformer second outer leg portion of the third leg has transformer magnetic flux traveling there through and the inductor outer leg portion of the third leg has inductor magnetic flux traveling there through. The inclusion of the slit in the third leg reduces DC flux leakage into the first, second and center legs of the transformer and thereby enhances efficiency of the transformer by reducing DC biasing caused by DC flux leakage into the transformer first, second and center legs.

DETAILED DESCRIPTION OF THE INVENTION

In the following detailed description of the preferred embodiment, reference is made to the accompanying drawings which form a part hereof and in which is shown by way of illustration an exemplary embodiment and a description having sufficient detail to enable those skilled in the art to practice the invention.

Figure 1:
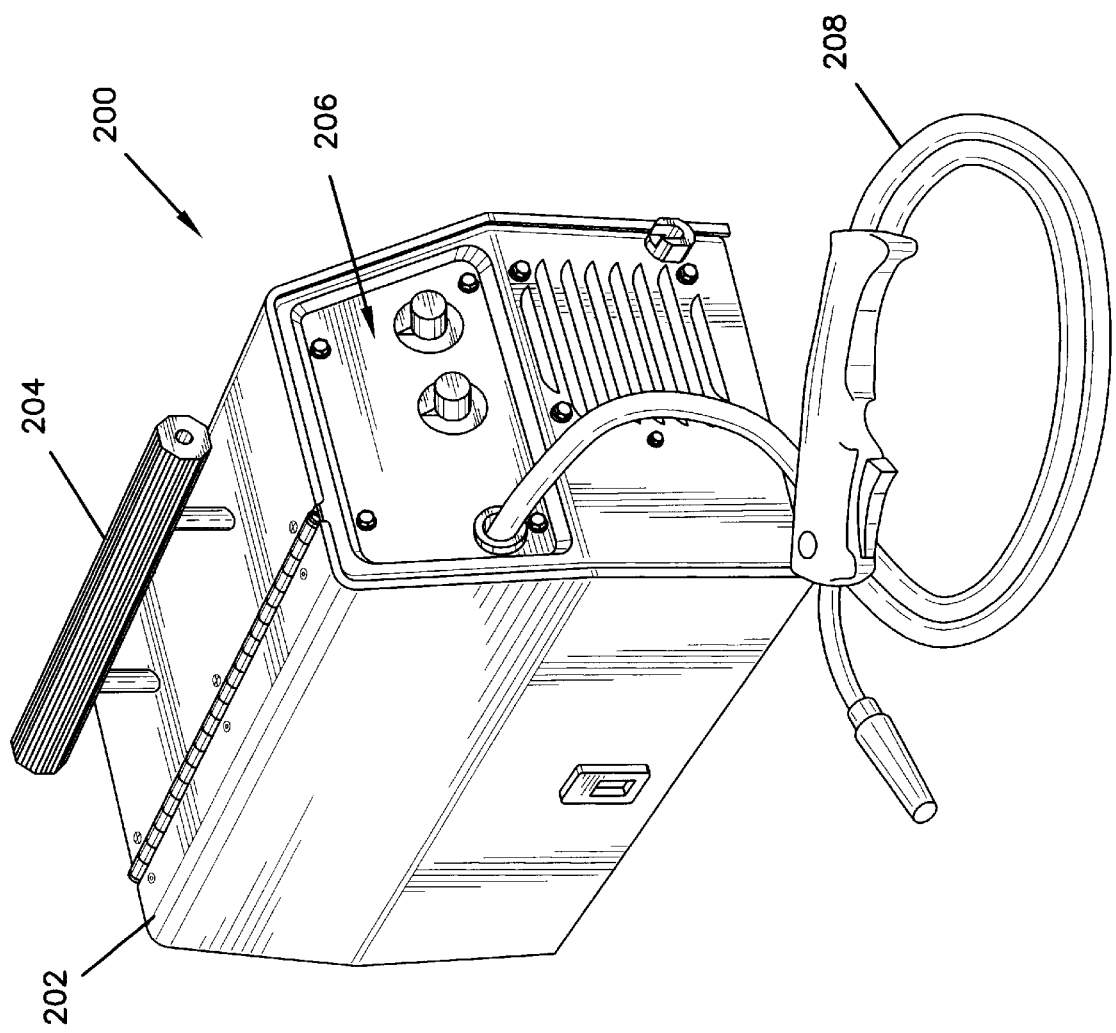
FIG. 1 is a perspective view of a portable arc welder.

Referring to FIG. 1, an arc welder 200 is shown including a housing 202, handle 204, control panel 206 and a metal inert gas gun 208. Disposed within housing 200 is a power supply circuit shown schematically in FIG. 2. That circuit has a main transformer 1, which includes a primary winding 2 and five secondary windings 10, 12, 14, 16 and 18. Power transformers for welders of the type shown in FIG. 2, typically carries input current of about 60 Hz, 120 volts RMS. The power input into the circuit comes into a switch 8, which includes a light 6 that acts as an indicator to the user as to when the power supply is on. Although the primary 2 is coupled to five secondaries 10, 12, 14, 16, 18, through a core 4, only secondaries 12, 14, 16, 18, each of which is center-tapped, supplies power to the welding electrode. The center taps of secondaries 12, 14, 16, 18 all connect to a common lead 22, which directs power output through a polarity block 24. Also shown, is a fan motor 26.

The secondaries 12, 14, 16 and 18 provide power to circuit board 28 which includes eight SCR's (not shown but referenced by J3–J10) and SCR control circuitry (not shown) which controls the manner by which the secondary windings 12, 14, 16 and 18 supply current to the center taps 22. In effect, the eight SCR's consist of two groups. One group is the odd numbered SCR's (i.e. J3, J5, J7, and J9), and the other is the even numbered SCR's (i.e. J4, J6, J8 and J10). The operation of the SCR's may be explained as follows.

During the positive swing of the input current, the polarity of the voltage across the two leads of any given secondary 12, 14, 16 and 18 is indicated by the pair of plus/minus signs 30. During the negative swing of the input current, the polarity is indicated by the pair of plus/minus signs 32 located adjacent the other pair. Each upper lead 34 in FIG. 2 connects to the cathode of an odd-numbered SCR. Each lower lead 36 connects to the cathode of an even-numbered SCR.

The anodes of the SCRs are all connected together, and are thereby kept at the same potential. Consequently, at the time when the upper leads 34 of the secondaries become negative, as when the voltage in the secondaries is indicated by plus/minus pair 30, the odd-numbered SCR's can be triggered into condition when a current flows through the odd-numbered diodes. (That is, the cathodes of the odd-numbered SCR's become negative with respect to node 38, which is connected to the base of the smoothing capacitor 40.) Then, when the lower leads of the secondaries become negative, as indicated by plus/minus pair 32, the even numbered SCR's can be triggered, for the same reasons as given above and, further, the odd-numbered SCR's become shut off at this time. Then this cycle repeats. Although it is not shown, in some embodiments, the circuit board would include pull-down resistors in order to pull the SCR gates to cathode potential, in order to prevent spurious triggering of the SCR's.

All the SCRs (J3–J10) are triggered by a single control circuit within circuit board 28. The control circuit would need to include a power section and a triggering section. The power section supplies power to the triggering section which enables the SCR's to operate as described above and it supplies power to the wire feed motor 42 and its associated speed controller 44 and break relay 46. The power section of the control circuit is switched into operation by closure of the gun trigger switch 48 which is located on a hand-held portion of the arc welder (not shown).

Figure 2:
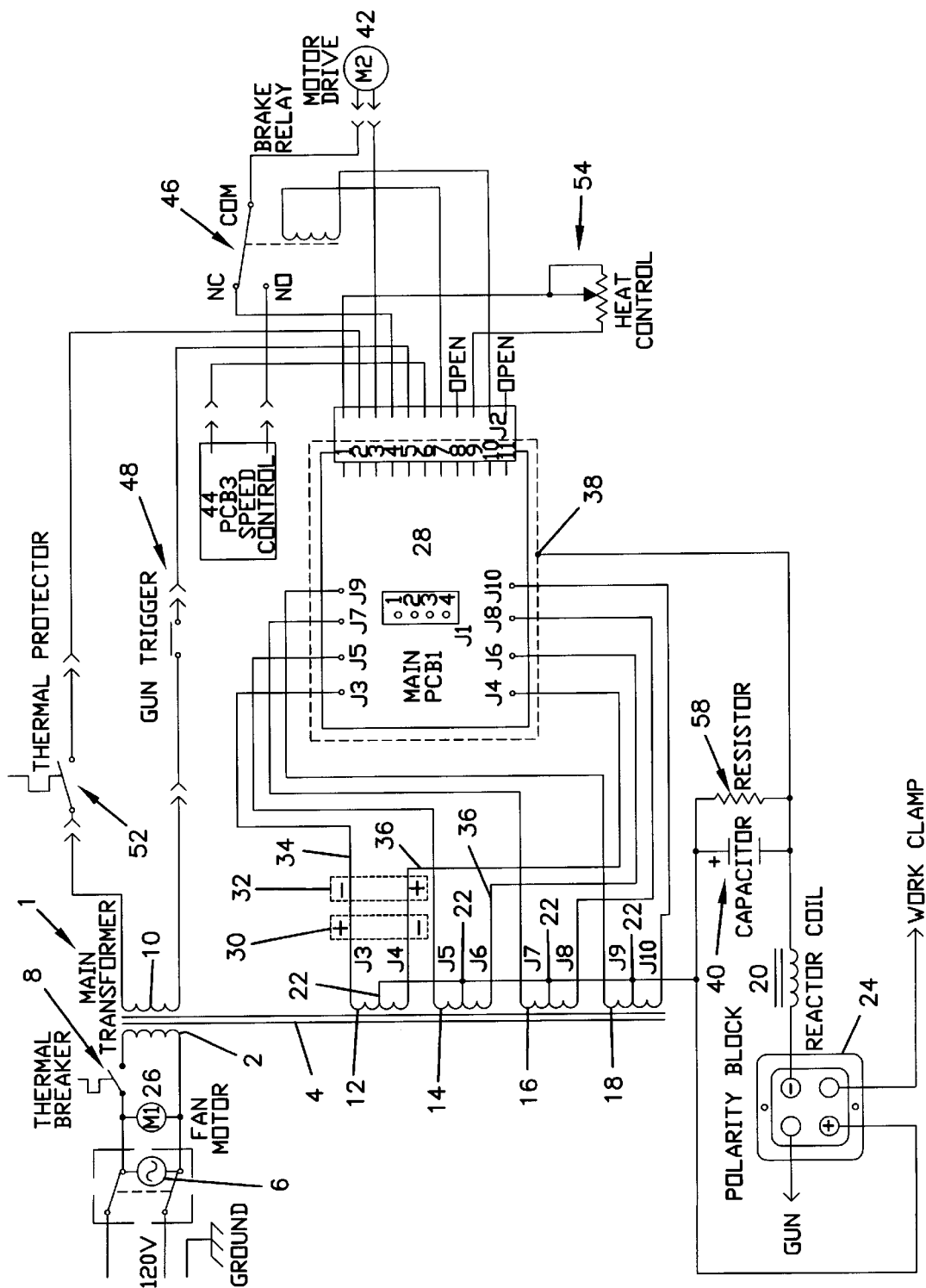
FIG. 2 is a schematic drawing of the power supply in accordance with the preferred embodiment of the present invention in which a combined transformer and inductor assembly is used.

The power section is powered by the fifth secondary winding 10 of the power transformer. The fifth secondary 10 drives the control circuit on circuit board 28 and includes a thermal protector 52 in series between the fifth secondary winding and the circuit board. In this embodiment, the thermal protector is a bi-metal piece comprised of two pieces of metal, each having different coefficients of expansion, that are bonded together. When the metals heat up, one expands more than the other one and removes the actual contacts. FIG. 2 also illustrates a heat control potentiometer 54.

The power supply circuit also includes an inductor 20. The inductor is necessary to ensure proper operation, whereby it smoothes out the current flow by storing energy and giving up energy when it is needed to help maintain a constant current output. The capacitor 40 is included to smooth out the voltage output, whereby it stores voltage and helps maintain a constant output voltage. Resistor 56 functions as a bleeder wherein it bleeds the voltage off the capacitor so that once the gun trigger which initiates activation of the arc welder is released, residual voltage is reduced. The polarity block 24 provides a method of modifying output polarity.

Combined Inductor Transformer Assembly

In the past, the transformer assembly 2, 10, 12, 14, 16, 18 and inductor assembly 20 shown in FIG. 2 have been two separate magnetically permeable "EE" cores, each having outer limbs each joined to a center limb by connecting limbs. The transformer circuit illustrated in FIG. 2 can operate with separate transformer and inductor assemblies. The power supply circuit illustrated in FIG. 2 is related to the circuit described in U.S. Pat. No. 5,260,545. In the circuit described in U.S. Pat. No. 5,260,545, the disclosure of which is incorporated herein by reference, the transformer and inductor assemblies are two separate units. The present invention improves upon conventional welder power supply circuitry having a single phase power transformer for supplying power to a welding electrode by adding a single core combined transformer and inductor assembly. The single core combined inductor and transformer assembly results in reduction of weight and material costs, which are significant features in the portable welder environment.

Figure 3:
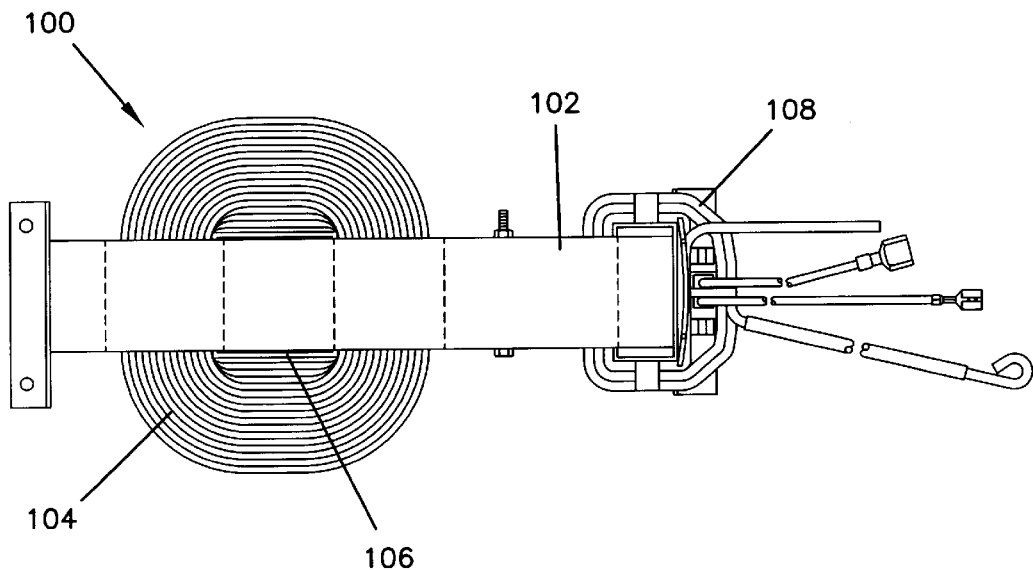
FIG. 3 is a top view of one preferred embodiment of the combined transformer and inductor assembly illustrating the transformer primary and secondary windings and inductor windings.
Figure 4:
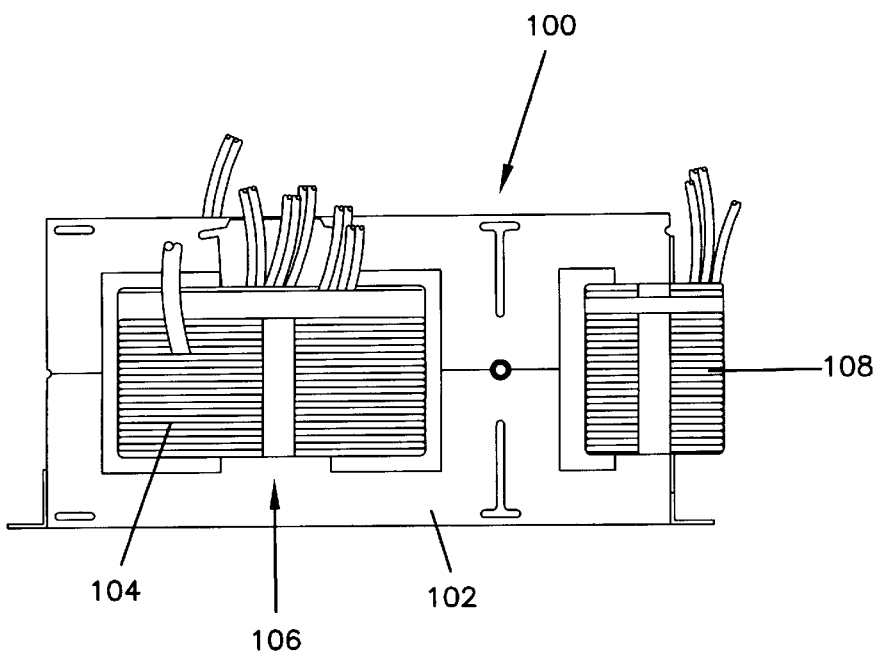
FIG. 4 is a side view of the combined transformer and inductor assembly illustrating the transformer and inductor windings.

The single core combined transformer and inductor assembly 100 is illustrated in FIGS. 3 and 4. It is comprised of a single four-legged core 102, primary windings 104 for receiving alternating current from the source, at least one secondary winding 106 and inductor windings 108. In the above-referenced power supply electrical circuit shown in FIG. 2, there are five secondary windings, 10, 12, 14, 16 and 18. It is to be understood that the single core combined transformer and inductor assembly can be utilized in transformers having multiple or singular primary windings and multiple or singular secondary windings. In addition, any welding power supply configuration having its transformer and inductor as independent units can substitute the independent transformer and inductor units for the present invention's single core combined transformer and inductor assembly.

Figure 5:
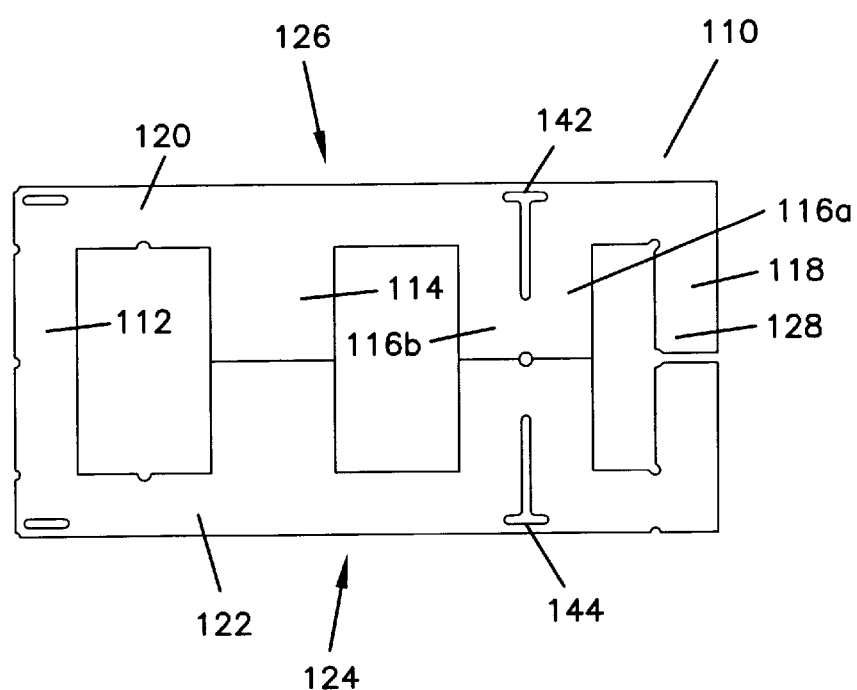
FIG. 5 is a drawing of a single lamination slab, a plurality of which create the four-legged core of the combined transformer and inductor assembly.

The four-legged magnetically permeable core is comprised of plurality of lamination plates. FIG. 5 is a schematic drawing illustrating the two lamination plates 124, 126 that comprise a lamination slab 110 for the core. The lamination slab 110 has a first limb 112, second limb 114, third limb 116 and fourth limb 118. The first limb 112 and third limb 116 function as the transformer outer limbs. The second limb 114 functions as the transformer center limb around which the primary and secondary windings would be wound. The fourth limb 118 functions as the inductor center leg around which the inductor winding would be wound. In addition to functioning as one of the transformer outer limbs, the third limb 116 functions as the inductor outer leg. Each lamination slab which makes up the four legged core includes an isolation slot 142 on the upper lamination plate 126 and an isolation slot 144 on the lower lamination plate 124. The lamination plates 124 and 126 are also configured in the fourth limb such that the two components which comprise the limb do not touch, thereby creating an air gap in the fourth limb. The air gap is included in fourth limb 118 in order to store some of the flux created in the inductor in order to control saturation of the magnetic core.

An inductor winding would be wound on fourth limb 118 (not shown) and a transformer winding (not shown) would be wound on third limb 116. In this embodiment, the width of first limb 112 and fourth limb 118 are equal and the width of second limb 114 and third limb 116 are equal. The first limb 112 and fourth limb 118 have a width that is half that of the second limb 114 and third limb 116. The widths are in this proportion in order to allow even distribution of magnetic flux created in the transformer and inductor.

Figure 6:
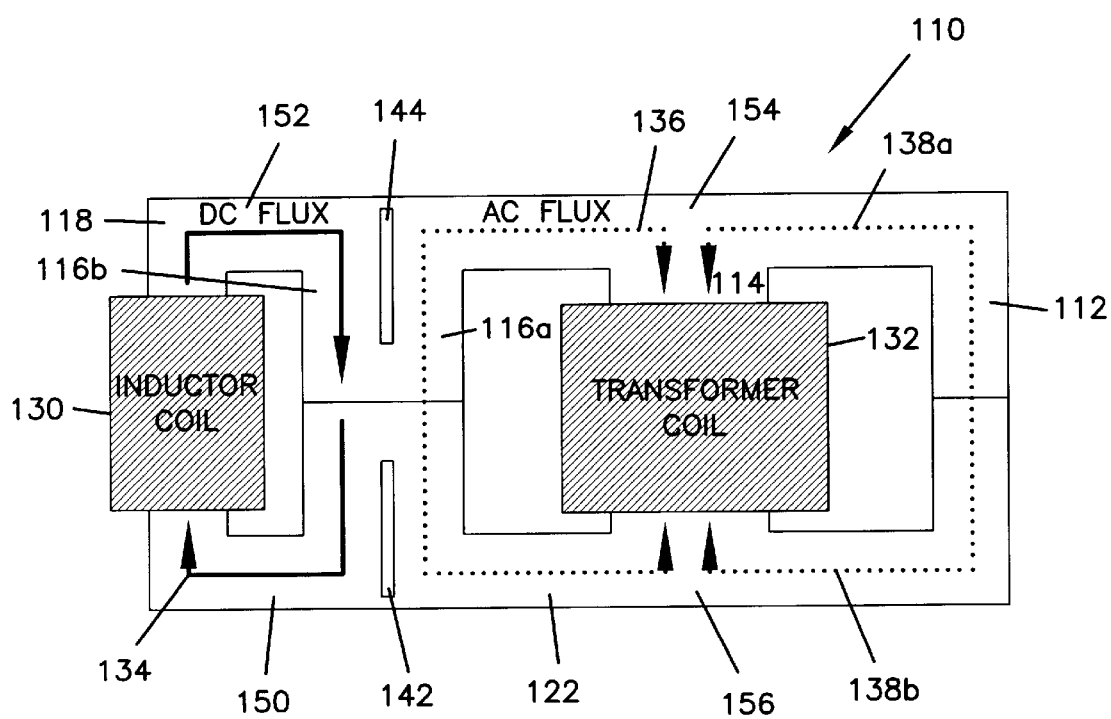
FIG. 6 is a view of the combined transformer and inductor assembly illustrating the flow of magnetic flux lines.

The distribution of magnetic flux in the single core combined transformer and inductor assembly is illustrated in FIG. 6. Following the application of a variable direct current source to the inductor windings 130 wrapped around fourth limb 118, a DC flux 134 is induced. The DC flux 134 flows through the fourth limb 118, top limb 152, a portion of third limb 116b and bottom limb 150 in the manner illustrated in FIG. 6. The fourth limb 118 includes an air gap (not shown) in order to store some of the flux 134 created in the inductor in order to control saturation of the magnetic core. Accordingly, the air gap provides the ability to store more energy in the inductor portion of the four legged core without saturating that section of the core. AC power is applied to transformer coils 132 and induces AC flux 136, 138. The AC flux 138 and 136 flows through second limb 114, top limb 154, first limb 112 and bottom limb 156 in the manner illustrated in FIG. 6.

The third limb 116 includes isolation slots 142 and 144. The isolation slots are included in the third limb in order to reduce leakage of DC flux 134 into other parts of the four legged core, including the top limb 154, second limb 114, first limb 112 and bottom limb 156. Accordingly, isolation slits 142 and 144 isolate a portion of the third limb 116a and thereby creates two separate limbs 116a and 116b, wherein a first portion 116a functions as the inductor outer limb and a second portion 116b functions as the transformer second outer limb.

As illustrated in FIGS. 5 and 6 the width of first limb 112 and fourth limb 118 are equal and the width of second limb 114 and third limb 116 are equal. The first limb 112 and fourth limb 118 have a width that is half that of second limb 114 and third limb 116. The third limb is twice the width of the fourth limb and the third limb in order to create flux line paths having the same density over the entire paths of the magnetic flux lines created by the transformer and inductor. Accordingly, as illustrated in FIG. 6, the flux density path for DC flux is consistent throughout its path traveled in limbs 118, 152, 116, and 150. The same principle regarding flux line density path consistency applies for the second limb except for there is no need for isolation slits because there is no need for isolation. There is only a need for a flux line path in the second limb having a density that is thick enough to allow AC flux from first limb 112 and third limb 116b to travel there through without saturation.

The isolation slits 142 and 144 are an important feature of the four-legged core because without the isolation slits 142 and 144, the DC flux would flow into the remaining limbs of the four-legged core and cause a DC bias in the rest of the transformer. Without the isolation slits, there is nothing to prevent the DC flux from traveling into the remaining limbs of the four-legged core. Because the flux density created by the inductor is DC, it doesn't reverse directions and is traveling in the clockwise direction as illustrated in FIG. 6 at all times. In contrast, the transformer windings are creating AC flux in the first limb 112, second limb 114 and third limb 116 wherein the flux density is traveling clockwise for one-half cycle and counterclockwise for the other half cycle. If there is no isolation of the DC flux created in the inductor, the DC flux will be added to the AC flux density in the transformer center leg 114, forcing the core into an asymmetrical mode of operation to where the core saturates earlier during one half cycle of operation thereby making the transformer less efficient.

In an embodiment wherein the power output is low, the early saturation of the transformer center leg 114 caused by the DC flux would be an acceptable characteristic. However, in applications where the power output needs to be high and the power input or power draw has to be maintained below a threshold level set by UL and CSA certification standards, failure to isolate the DC flux will cause an increased current draw.

It is to be understood that even though numerous characteristics and advantages of various embodiments of the present invention have been set forth in the foregoing description, together with details of the function of various embodiments of the invention, this disclosure is illustrative only, and changes may be made in detail, especially in matters of structure and arrangement of steps within the principles of the present invention to the full extent indicated by the broad general meaning of the terms in which the appended claims are expressed. Further, it is intended that it will be appreciated by those skilled in the art that the teachings of the present invention can be applied to welder power supply circuits other than those disclosed herein, without departing from the scope and spirit of the present invention.

What is claimed:

1. In a welder having a single phase power transformer for supplying power to a welding electrode, the improvement comprising a combined transformer and inductor assembly comprising:

a core having a first, second, third and fourth legs;

a primary winding for receiving alternating current from a source, said primary winding being wound around said second leg of said core to comprise a transformer center leg;

at least one secondary winding wound around said second leg of said core; and an inductor winding wound around said fourth leg of said core;

said second leg of said core comprising a first outer leg of the transformer;

said third leg of said core having at least one slit down the center of said third leg, wherein said slit creates two legs within said third leg comprising a second outer leg of the transformer and an inductor outer leg.

2. A welding power supply for supplying power to a welding electrode comprising:

a transformer including a primary winding for receiving a single phase A.C. current from a single phase A.C. power source and at least one secondary winding; and an inductor including a winding wound around a fourth leg of a four legged core for receiving D.C. current;

said primary winding being wound around a second leg of said four legged core to comprise the transformer center leg;

said at least one secondary winding wound around said second leg of said four legged core;

a second leg of said core comprising a first outer leg of the transformer;

a third leg of said core comprising a second outer leg of the transformer and an outer leg of the inductor, said third leg including at least one slit in the center of said third leg so as to isolate the magnetic flux traveling through said second outer leg of the transformer and said outer leg of the inductor.

* * * * *